United States Patent
Chen, Jr. et al.

(10) Patent No.: US 9,361,327 B1
(45) Date of Patent: Jun. 7, 2016

(54) ROLLING BLOOM FILTER FOR DATA WITH RETENTION POLICY

(71) Applicant: EMC Corporation, Hopkinton, MA (US)

(72) Inventors: Peter Chen, Jr., Shanghai (CN); Qin Xin, Broken Arrow, OK (US); Qi Bao, Boxborough, MA (US); Feng Zhang, Sherborn, MA (US); Martin Wang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 498 days.

(21) Appl. No.: 13/729,361

(22) Filed: Dec. 28, 2012

(51) Int. Cl.
*G06F 17/30* (2006.01)

(52) U.S. Cl.
CPC ...... *G06F 17/30303* (2013.01); *G06F 17/3033* (2013.01)

(58) Field of Classification Search
CPC .................................. G06F 17/00; G06F 17/30
See application file for complete search history.

(56) References Cited

U.S. PATENT DOCUMENTS

| | | | | |
|---|---|---|---|---|
| 8,266,179 B2 * | 9/2012 | Forman | ................. | G06F 17/277 707/791 |
| 8,370,460 B1 * | 2/2013 | Khakpour | ........... | H04L 67/2842 709/203 |
| 8,700,578 B1 * | 4/2014 | Varadan | .............. | G06F 17/3015 707/692 |
| 8,706,914 B2 * | 4/2014 | Duchesneau | ......... | G06F 9/5072 709/203 |
| 8,706,915 B2 * | 4/2014 | Duchesneau | ......... | G06F 9/5072 709/203 |
| 8,751,448 B1 * | 6/2014 | Douglis | ................. | G06F 3/0641 707/626 |
| 8,856,141 B1 * | 10/2014 | Dean | ...................... | G06Q 50/01 707/748 |
| 8,898,204 B1 * | 11/2014 | Sathe | ...................... | G06F 17/30 707/812 |
| 2009/0216910 A1 * | 8/2009 | Duchesneau | ......... | G06F 9/5072 709/250 |
| 2009/0292679 A1 * | 11/2009 | Ganesh | ............... | G06F 11/1474 |
| 2011/0219010 A1 * | 9/2011 | Lim | ........................ | G06F 17/30 707/747 |
| 2012/0197875 A1 * | 8/2012 | Bai | .......................... | G06F 17/30 707/723 |
| 2013/0218901 A1 * | 8/2013 | Majnemer | ............. | G06F 3/0647 707/747 |
| 2013/0227051 A1 * | 8/2013 | Khakpour | ............. | G06F 15/167 709/213 |
| 2013/0306276 A1 * | 11/2013 | Duchesneau | ......... | G06F 9/5072 165/104.21 |

(Continued)

OTHER PUBLICATIONS

Phyu, Myat Pwint, and Ni Lar Thein. "Efficient storage management for distributed storage system." In Fourth International Conference on Machine Vision (ICMV 11),International Society for Optics and Photonics, 2011, pp. 1-5.*

(Continued)

*Primary Examiner* — Farhan Syed
(74) *Attorney, Agent, or Firm* — Ryan, Mason & Lewis, LLP

(57) ABSTRACT

A data structure comprising two or more sub data structures representing a given data set is maintained. Each of the two or more sub data structures comprises an array of bit positions and has a set of hash functions associated therewith. Each of the hash functions is operable to map an element of the given data set to at least one of the bit positions of the array. One of the two or more sub data structures is recognized as a master sub data structure and the others of the two or more sub data structures as slave sub data structures. Insertion and deletion of elements in the data structure is based on the recognition of each of the two or more sub data structures as the master sub data structure or one of the slave sub data structures.

20 Claims, 6 Drawing Sheets

(56) References Cited

U.S. PATENT DOCUMENTS

| | | | | |
|---|---|---|---|---|
| 2013/0318051 | A1* | 11/2013 | Kumar | G06F 17/30156 707/692 |
| 2014/0052750 | A1* | 2/2014 | Ciabrini | G06Q 10/02 707/769 |
| 2014/0074819 | A1* | 3/2014 | Idicula | G06F 17/30289 707/719 |
| 2014/0089271 | A1* | 3/2014 | Al-Otoom | G06F 9/3842 707/690 |
| 2014/0115182 | A1* | 4/2014 | Sabaa | H04L 67/1097 709/232 |
| 2014/0122509 | A1* | 5/2014 | Pantaleoni | G06F 17/30023 707/754 |
| 2014/0317315 | A1* | 10/2014 | Duchesneau | G06F 9/5072 709/250 |

OTHER PUBLICATIONS

Grigorik, Ilya, "Flow Analysis and Time-based Bloom Filters," retrieved from https://www.igvita.com/2010/01/06/flow-analysis-time-based-bloom-filters/, Jan. 6, 2010, pp. 1-3.*
Cho, Chia Yuan, Sin Yeung Lee, Chung Pheng Tan, and Yong Tai Tan. "Network forensics on packet fingerprints." In Security and Privacy in Dynamic Environments, pp. 401-412. Springer US, 2006.*
Roussev, Vassil, Golden G. Richard, and Lodovico Marziale. "Multi-resolution similarity hashing." digital investigation 4 (2007): 105-113.*
Chen, Ting, Yongjian Wang, Yuanqiang Huang, Cheng Luo, Depei Qian, and Zhongzhi Luan. "A Two-Phase Log-Based Fault Recovery Mechanism in Master/Worker Based Computing Environment." In Parallel and Distributed Processing with Applications, 2009 IEEE International Symposium on, pp. 290-297. IEEE, 2009.*
Parthasarathy, Srinivasan, and Deepa Kundur. "Bloom filter based intrusion detection for smart grid SCADA." In Electrical & Computer Engineering (CCECE), 2012 25th IEEE Canadian Conference on, pp. 1-6. IEEE, 2012.*
Aiyer, Amitanand S., Mikhail Bautin, Guoqiang Jerry Chen, Pritam Damania, Prakash Khemani, Kannan Muthukkaruppan, Karthik Ranganathan, Nicolas Spiegelberg, Liyin Tang, and Madhuwanti Vaidya. "Storage Infrastructure Behind Facebook Messages: Using HBase at Scale." IEEE Data Eng. Bull. 35, No. 2 (2012): 4-13.*
Shilane, Phlip, Mark Huang, Grant Wallace, and Windsor Hsu. "WAN-optimized replication of backup datasets using stream-informed delta compression." ACM Transactions on Storage (TOS) 8, No. 4 (2012): 13.*
Roussev, Vassil. "Building a better similarity trap with statistically improbable features." In System Sciences, 2009. HICSS'09. 42nd Hawaii International Conference on, pp. 1-10. IEEE, 2009.*
Ponec, Miroslav, Paul Giura, Joel Wein, and Hervé Brönnimann. "New payload attribution methods for network forensic investigations." ACM Transactions on Information and System Security (TISSEC) 13, No. 2 (2010): 15.*
L. Fan et al., "Summary Cache: A Scalable Wide-Area Web Cache Sharing Protocol," IEEE/ACM Transactions on Networking, Jun. 2000, pp. 281-293, vol. 8, No. 3.
A. Broder et al., "Network Applications of Bloom Filters: A Survey," Internet Mathematics, 2004, pp. 485-509, vol. 1, No. 4.
P.S. Almeida et al., "Scalable Bloom Filters," Information Processing Letters, Mar. 2007, pp. 255-261, vol. 101, No. 6.
Burton H. Bloom, "Space/Time Trade-Offs in Hash Coding with Allowable Errors," Communications of the ACM, Jul. 1970, pp. 422-426, vol. 13, No. 7.
P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

ROLLING BLOOM FILTER FOR DATA WITH RETENTION POLICY

FIELD

The field relates to data processing systems, and more particularly to techniques for constructing and utilizing improved bloom filter data structures.

BACKGROUND

A bloom filter is a space-efficient probabilistic data structure that is used to test whether an element is a member of a set, and was first introduced in B. Bloom, "Space/Time Tradeoffs in Hash Coding with Allowable Errors," Communications of the ACM 13:7, pp. 422-426 (1970). The bloom filter is a succinct representation of a set of data, wherein the bloom filter data structure is more efficient to operate on and/or electronically transmit than the data set which it represents. An empty bloom filter is a bit array of m bits, all set to zero (0). For the filter, there are k different hash functions defined, each of which maps or hashes some set element to one of the m array positions with a uniform random distribution. To add an element, the element is fed to each of the k hash functions to get k array positions. The bits at all of these positions are set to one (1). To query for an element (test whether it is in the set), the element is fed to each of the k hash functions to get k array positions. If any of the bits at these positions are 0, the element is definitely not in the set—if it were, then all the bits would have been set to 1 when it was inserted. If all are 1, then either the element is in the set, or the bits have by chance been set to 1 during the insertion of other elements, resulting in a false positive. However, for certain data applications in which the bloom filter is used, a false positive can be tolerated when compared with the operation and transmission efficiencies that flow from its use.

Assume however that a data set changes over time, whereby elements of the set can be inserted and/or deleted. Inserting elements into a bloom filter, as explained above, is easily accomplished by hashing the element k times and setting the resulting bits to 1. However, deleting an element cannot be accomplished simply by reversing the insertion process. If the element to be deleted is hashed and the corresponding bits set to 0, a location may be errantly set to 0 that is hashed to by some other element in the set. In this case, the bloom filter no longer correctly represents all elements in the data set. To address this problem, L. Fan et al, "Summary Cache: A Scalable Wide-Area Web Cache Sharing Protocol," IEEE/ACM Transactions on Networking 8:3, pp. 281-294 (2000), introduced a counting bloom filter. In a counting bloom filter, each entry in the bloom filter is a counter rather than a single bit. Thus, when an element is inserted into the bloom filter, corresponding counters are incremented, and when an element is deleted from the bloom filter, corresponding counters are decremented. While it is beneficial that a counting bloom filter supports both element insertion and deletion operations, a counting bloom filter typically requires about three to eight times more memory space for storage than a basic (bit-based, as described above) bloom filter.

SUMMARY

Embodiments of the invention provide techniques for improved bloom filter construction and operation. While the improved bloom filter construction and operation techniques are well-suited for use in a data processing system that has a data retention policy, such techniques are more broadly applicable to other data processing systems.

In one embodiment, a method comprises the following steps. A data structure comprising two or more sub data structures representing a given data set is maintained. Each of the two or more sub data structures comprises an array of bit positions and has a set of hash functions associated therewith. Each of the hash functions is operable to map an element of the given data set to at least one of the bit positions of the array. One of the two or more sub data structures is recognized as a master sub data structure and the others of the two or more sub data structures as slave sub data structures. Insertion and deletion of elements in the data structure is based on the recognition of each of the two or more sub data structures as the master sub data structure or one of the slave sub data structures. The maintaining and recognizing steps are executed via at least one processor device.

In another embodiment, a computer program product is provided which comprises a processor-readable storage medium having encoded therein executable code of one or more software programs. The one or more software programs when executed by the at least one processor device implement steps of the above-described method.

In yet another embodiment, an apparatus comprises a memory and at least one processor device operatively coupled to the memory and configured to perform steps of the above-described method.

Advantageously, illustrative embodiments described herein enable implementation of time-based and/or space-based data retention policies by employing the master/slave relationship between the sub data structures in the data structure. In illustrative embodiments, the data structure is referred to as a rolling bloom filter and the sub data structures are referred to as sub bloom filters.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Figure 1:
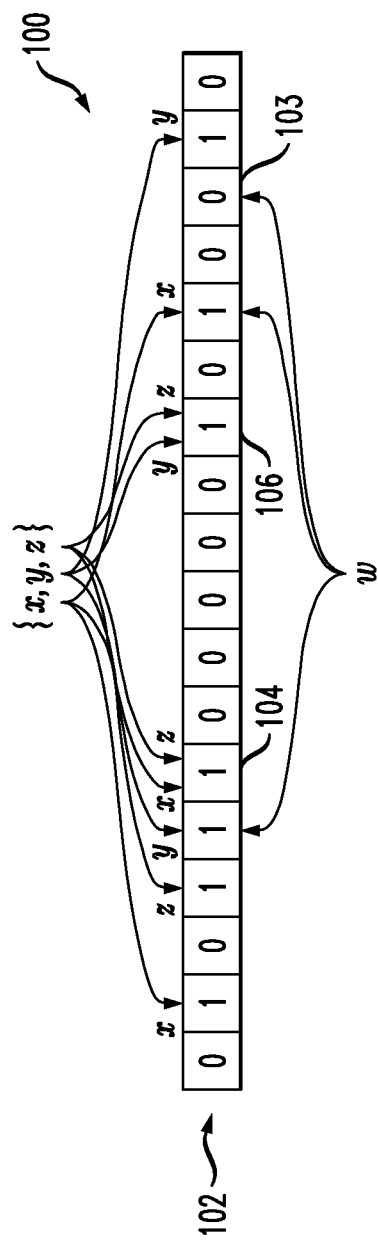
FIG. 1 illustrates a basic bloom filter data structure.

FIG. 1 illustrates a basic bloom filter data structure, e.g., as first introduced in the above-mentioned B. Bloom, "Space/Time Tradeoffs in Hash Coding with Allowable Errors," Communications of the ACM 13:7, pp. 422-426 (1970). The bloom filter 100 in FIG. 1 represents a given data set {x, y, z}. The arrows with associated element references (for ease of illustration) show the positions in the bit array 102 to which each set element is mapped. Note that the element w is not in the set {x, y, z}, because it hashes to one bit-array position 103 containing 0. Note that for this bloom filter data structure, the array bit positions m=18 and the set of hash functions k=3.

However recall that, as explained above, the basic bloom filter 100 does not accommodate element deletion. For example, assume that one wanted to delete data set element z from the bloom filter 100. By setting to 0 all the bit positions that were originally set to 1 when z was inserted into the bloom filter 100, this would also set two bit positions (i.e., denoted as 104 and 106) to 0 that still have other data set elements (i.e., x and y, respectively for positions 104 and 106) hashed thereto. As such, the bloom filter 100 would no longer correctly represent the remaining elements in the data set.

Embodiments of the invention provide improved bloom filter data structures that support data set element insertion and deletion operations, and that support data retention policies, both temporal-based and/or spatial-based. It is to be appreciated that data storage systems that utilize bloom filters may typically have data retention policies to enforce. As used herein, a "data retention policy" is a policy that dictates the criteria for retaining data in storage. For example, a time-based data retention policy in a data storage system indicates that data be stored for a given time period, while a space-based data retention policy indicates that data be stored until a given amount of storage (storage threshold) has been reached.

Embodiments of the invention provide rolling bloom filter data structures that support data retention policies. In one embodiment, to be described below in the context of FIG. 2, a rolling bloom filter data structure supports a mono time-based retention policy. In another embodiment, to be described below in the context of FIG. 3, a rolling bloom filter data structure supports multiple time-based retention policies. In yet another embodiment, to be described below in the context of FIG. 4, a rolling bloom filter data structure supports a space-based retention policy.

A rolling bloom filter is composed of a set of sub bloom filters (sub data structures) which effectively function as one bloom filter (one data structure). Each sub bloom filter is capable of operating in one of two states, i.e., master or slave. During a given time period, there is only one sub bloom filter recognized and operating as the master sub bloom filter. The other sub bloom filters, during the given time period, are recognized and operating as slave sub bloom filters. The master role is rotated among all sub bloom filters in sequence (hence, the term "rolling" bloom filter). In one embodiment, every sub bloom filter owns the master state for an equal period t. An entire master role rotation cycle takes T (T=ts) time, where s stands for the number of sub bloom filters in the overall rolling bloom filter data structure.

Figure 2:
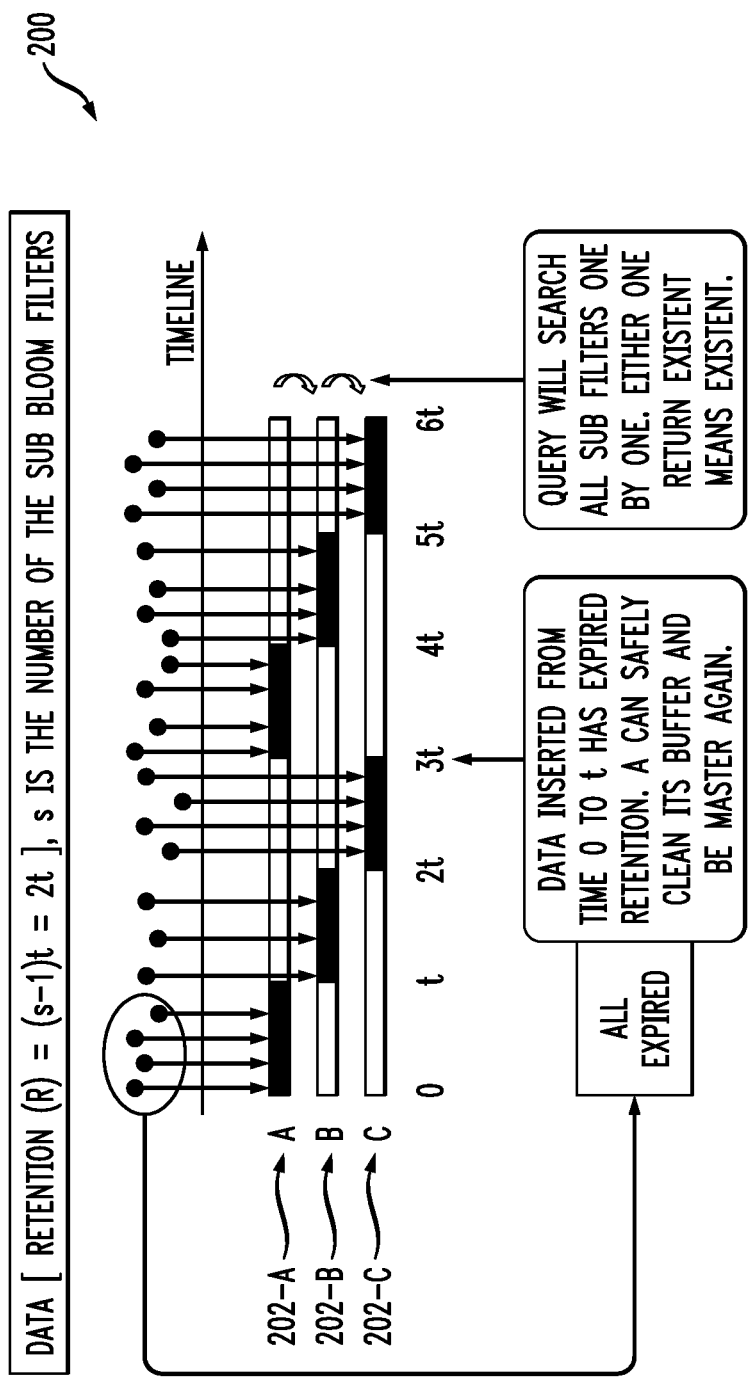
FIG. 2 illustrates a rolling bloom filter data structure in accordance with a first embodiment of the invention.

FIG. 2 illustrates a rolling bloom filter data structure 200 in accordance with a first embodiment of the invention. The data structure 200 is a basic rolling bloom filter data structure comprising three sub bloom filter data structures 202-A, 202-B and 202-C. It is to be appreciated that the bloom filter data structure 200 could alternatively have two sub data structures or more than three sub data structures.

The data structure 200 is referred to as a basic rolling bloom filter. In the basic rolling bloom filter, each sub bloom filter has the same (or substantially the same) storage capacity. Also, each sub bloom filter uses the same set of hash functions. Further, in the basic rolling bloom filter, master role transition is started with a buffer cleaning operation. That means that the memory associated with the sub bloom filter that is recognized as the master is cleared at the start of the time period in which that sub bloom filter serves as the master.

To add a data element into the basic rolling bloom filter, only the master sub filter is updated, i.e., new data elements are only added into the master sub bloom filter (which, as explained above, rotates from time period to time period). To query for a data element in the basic rolling bloom filter, the master sub filter and the slave sub filters function the same, i.e., all sub filters in the basic rolling bloom filter are queried and a hit is returned if the data element is found in any of the sub filters.

With respect to the data structure 200 operating as a basic rolling bloom filter, it is to be appreciated that s=3. Sub data structures A (202-A), B (202-B) and C (202-C) are the three sub bloom filters of the rolling bloom filter. As illustrated, sub filters rotate the master role every t period and an entire rotation cycle is T=ts=3 t time. In period 0~t, A is the master filter. Only A will be updated during this period. Then, in period t~2t, B is the master filter. And so on, in period 2t~3t, C is the master filter. At that point, an entire rotation cycle completes. A's buffer is then cleaned and a new round of master rotation starts and runs from 3t~6t.

The basic rolling bloom filter (e.g., data structure 200) can be used in a data storage system application that needs to support a single time-based retention policy. If the retention policy is that data will be removed after R time, then the basic rolling bloom filter's rotation cycle T=ts needs to satisfy equation t(s−1)=R. Thus, every sub filter cleans its buffer after R time following the end of its last master role period. For a given single data element, its record in the basic rolling bloom filter is removed after R~R+t time. The precise retention period of this record depends on the offset of its insertion time in a sub bloom filter. This property ensures tolerance of false positives.

In classic bloom filter theory, for a bloom filter with m bits and k hash functions, its false positive rate F can be defined as formula ①, which n presents for maximal insertion count:

$$F = \left(1 - \left(1 - \frac{1}{m}\right)^{kn}\right)^k \approx (1 - e^{-nk/m})^k \qquad ①$$

From formula ①, we can deduce formula ② for a bloom filter space cost of m bits:

$$m = \frac{-nk}{\ln(1 - P^{1/k})} \qquad ②$$

It has been proven that F has minimal value when $$k = \frac{m}{n} \ln 2. \qquad ③$$

Associate ① and ③, we have $$m = -\frac{n \ln F}{(\ln 2)^2}, \qquad ④$$

which is the space cost for a specified false positive and optimal hash function count. Introducing ④ into ③①, we have $$k = -\frac{\ln F}{\ln 2}, \quad (5)$$

which gives the optimal hash function count for a given false positive F.

In practice, k needs to be an integer. We can easily round down k to have a sensible value $$k = \left\lfloor -\frac{\ln F}{\ln 2} \right\rfloor. \quad (6)$$

After Introducing ⑥ into ②, we obtain a practical minimal space cost ratio α for a given false positive F:

$$\begin{cases} \alpha = \frac{m}{n} = \frac{-k}{\ln(1 - F^{1/k})} \\ k = \left\lfloor -\frac{\ln F}{\ln 2} \right\rfloor \end{cases} \quad (7)$$

For a basic rolling bloom filter, it is composed of a set of (s) small bloom filters, each with false positive f. The false positive of the basic rolling bloom filter can be described as $F = 1 - (1-f)^s$. Then, it is straightforward to obtain $f = 1 - (1-F)^{1/s}$ ⑧. With formula ②, the size of the basic rolling bloom filter m is:

$$\begin{cases} m = \frac{-snk}{(8-1)\ln(1 - f^{1/k})} \\ f = 1 - (1-F)^{1/s} \end{cases} \quad (9)$$

The practical minimal space cost ratio α' of the basic rolling bloom filter can be described as ⑩:

$$\begin{cases} \alpha' = \frac{m}{n} = \frac{-sk}{(s-1)\ln(1 - f^{1/k})} \\ f = 1 - (1-F)^{1/s} \\ k = \left\lfloor -\frac{\ln f}{\ln 2} \right\rfloor \end{cases} \quad (10)$$

Performance of updating the basic rolling bloom filter is O(k), where k is the hash function count. Performance of searching an element in the basic rolling bloom filter is O(sk), where s stands for the sub bloom filter count. Because all bloom filter operations are in memory, and in practical situation, k and s are typically relatively small, so the solution is time-efficient.

The basic rolling bloom filter's space performance is related to the number of elements (n), the false positive probability (F) and the number of sub bloom filters (s). The space cost ratio α is a suitable standard to judge the basic rolling bloom filter's space performance. Thus, the space cost ratio α stands for number of bits used per element:

$$\begin{cases} m = \frac{-snk}{(s-1)\ln(1 - f^{1/k})} \\ \alpha = \frac{m}{n} = \frac{-sk}{(s-1)\ln(1 - f^{1/k})} \approx -\frac{\ln f}{(\ln 2)^2} \\ f = 1 - (1-F)^{1/s} \\ k = \left\lfloor -\frac{\ln f}{\ln 2} \right\rfloor \end{cases}$$

For example, assume the maximal elements (n) of a basic rolling bloom filter is 1,000,000. Assume also the false positive probability F to be 5% and sub filter count s to be 10, than we can get α≈11. Compare this to the fact that the storage performance of a similar counting bloom filter, as mentioned above in the background section, is always larger than 25. Thus, the basic rolling bloom filter is space-efficient.

Table 1 shows a more detailed relationship among space cost ratio, sub filters count and false positive:

TABLE 1

| Relationship of RBF Parameters | | | | | | | |
|---|---|---|---|---|---|---|---|
| | | False positive of rolling bloom filters (F) | | | | | |
| | | 0.05 | 0.04 | 0.03 | 0.02 | 0.01 | |
| Sub bloom filter count (s) | 3 | 5 | 6 | 6 | 7 | 8 | Hash count (k) |
| | | 12.838 | 13.442 | 14.391 | 15.627 | 17.801 | Space cost ratio (α) |
| | 5 | 6 | 6 | 7 | 7 | 8 | Hash count (k) |
| | | 11.964 | 12.605 | 13.289 | 14.419 | 16.224 | Space cost ratio (α) |
| | 7 | 7 | 7 | 7 | 8 | 9 | Hash count (k) |
| | | 11.947 | 12.512 | 13.263 | 14.216 | 15.908 | Space cost ratio (α) |
| | 9 | 7 | 7 | 8 | 8 | 9 | Hash count (k) |
| | | 12.121 | 12.685 | 13.326 | 14.325 | 15.954 | Space cost ratio (α) |

Regarding deletion of data in the basic rolling bloom filter, deletion of data and clearance of a corresponding record is not necessarily synchronized. For example, in FIG. 2, with a retention period R=2t, if a data element Dx was inserted in Tx time, 2t<Tx<3t, then it would be deleted in Tx', 4t<Tx'<5t. In FIG. 2, it is straightforward to find that the sub bloom filter used by data element Dx is C. The modification time is equal to the insertion time Tx, but the deletion time is 5t which is later than data's deletion time Tx'. This means that we would get a false positive result for data Dx in time period between Tx' and 5t. However, we can increase the number of sub bloom filters to decrease the false positive rate caused by the delayed deletion situation. While this may increase the complexity of the system, the rolling bloom filter approach is flexible enough to allow a user to find a balance in complexity and accuracy for any given domain-specific application.

The basic rolling bloom filter support mono time-based retention policy. To support multiple time-based retention policies and a space-based retention policy, embodiments of the invention provide variants to the basic rolling bloom filter. One variant is for supporting multiple time-based retention policies support (FIG. 3 embodiment), and the other is for supporting a space-based retention policy (FIG. 4 embodiment).

Figure 3:
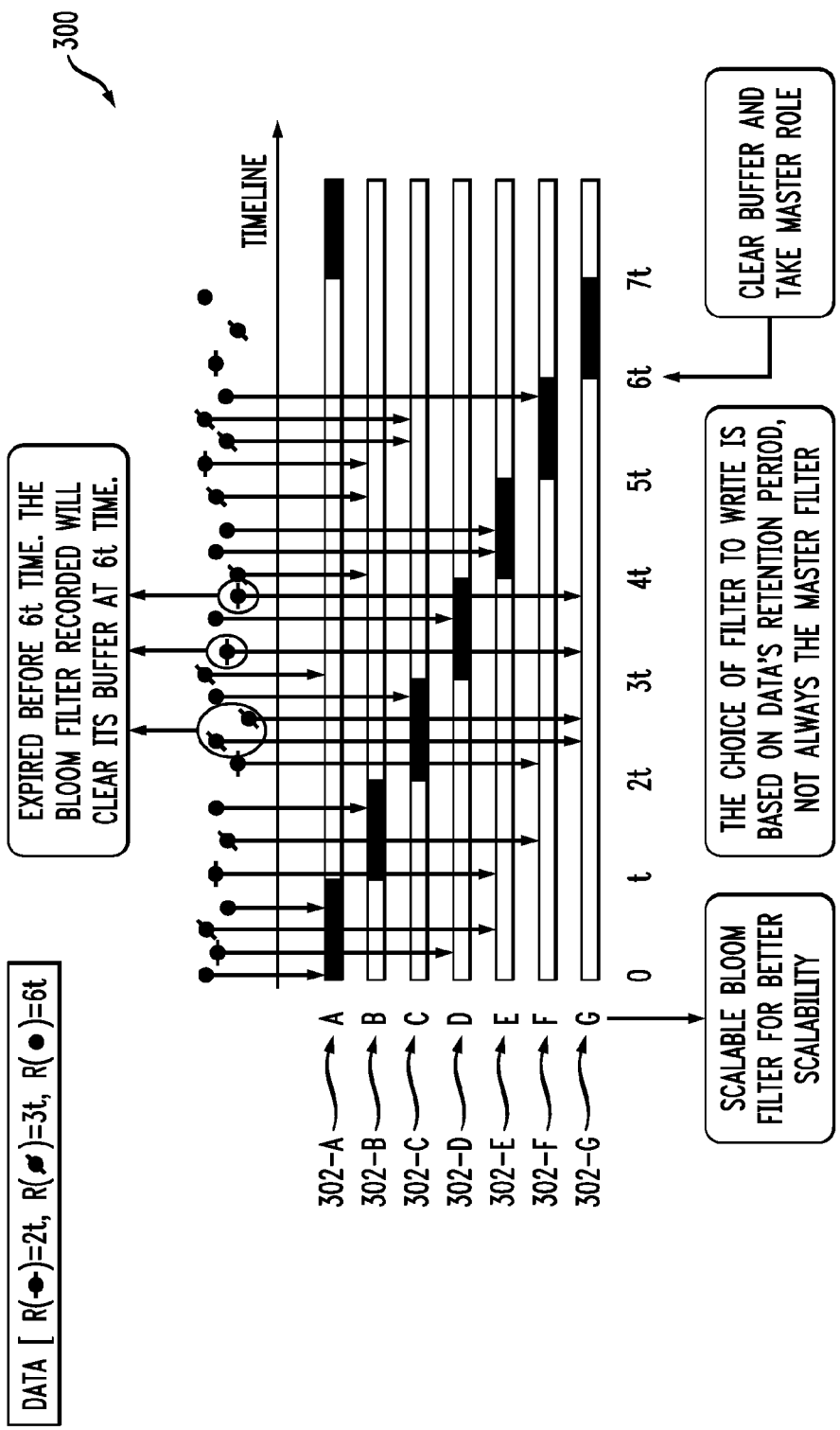
FIG. 3 illustrates a rolling bloom filter data structure in accordance with a second embodiment of the invention.
Figure 4:
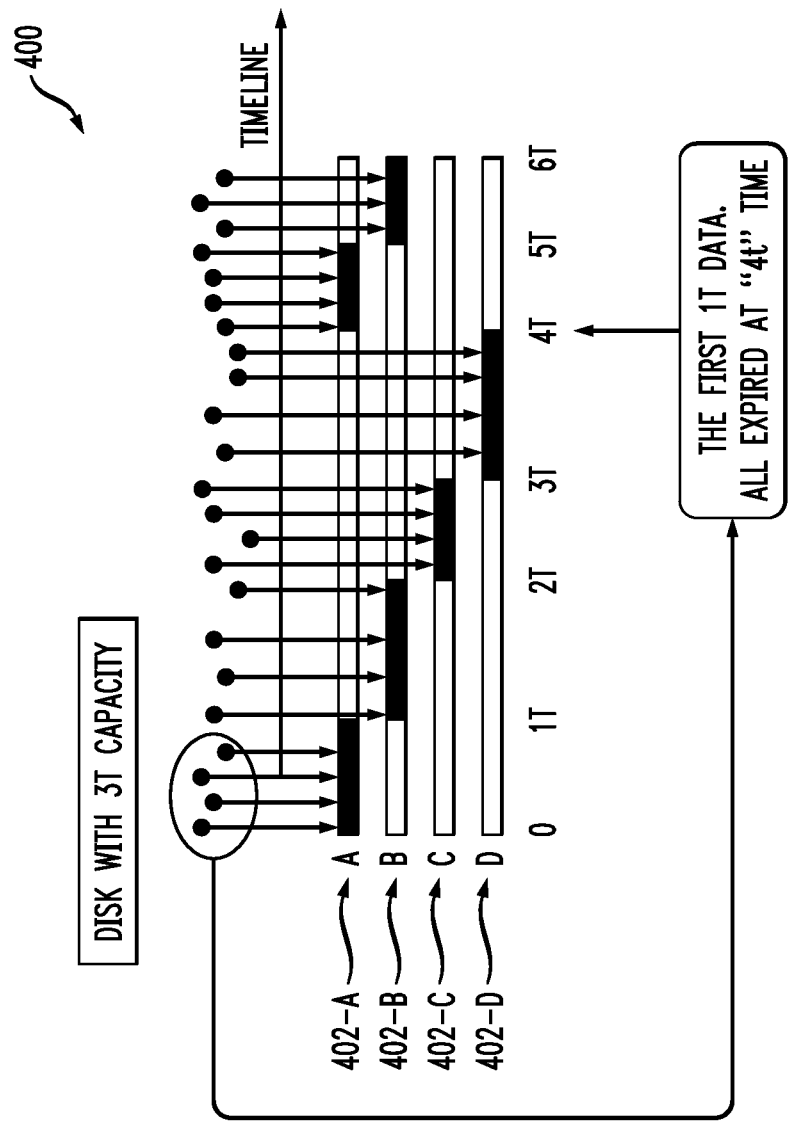
FIG. 4 illustrates a rolling bloom filter data structure in accordance with a third embodiment of the invention.

FIG. 3 illustrates a rolling bloom filter data structure 300 for supporting multiple time-based retention policies. As shown, the rolling bloom filter data structure 300 comprises seven sub bloom filter data structures 302-A, 302-B, 302-C, 302-D, 302-E, 302-F and 302-G.

Recall that in the basic rolling bloom filter (FIG. 2 embodiment), only the master sub filter will be updated. While the basic rolling bloom filter works well in the case of only one time retention policy, it is common to have data storage system applications with multiple time retention policies. Applications with multiple time retention policies tend to yield worse false positive ratios. To address this issue, an embodiment is provided with two main changes to the basic rolling bloom filter design. The first change is that the sub filter to be updated is based on the data's retention period. The second change is to use scalable bloom filter data structures as sub filter structures.

To understand the solution easier, let us use the following example. Assume a data storage system has three retention policies: $T_1=4$ weeks, $T_2=12$ weeks, and $T_3=24$ weeks. The longest retention period is thus T=24 weeks. The solution is to use s=25 sub filters in the rolling bloom filter. We designate these sub filters as $f_1, f_2, f_3 \ldots f_{25}(f_s)$. Each sub filter owns the master state for t=1 week (s=T/t+1).

Comparing the multiple time-based retention policy embodiment with the basic rolling bloom filter explained above in the context of FIG. 2:

(1) The update process is different. Again, in the basic rolling bloom filter, only the master sub filter is updated. But the sub filter being updated here is dependent on its policy period (RT). We mark the sub filter to be updated as y, and the current master sub filter as x:

$$y = f(x) = \begin{cases} x+1+RT/t, & x \leq (T-RT)/t \\ x+1+RT/t-s = x-(T-RT)/t, & x > (T-RT)/t \end{cases}$$

e.g., assume that a record for insertion comes when the master sub filter is $f_{18}$. If the retention policy of this file is 4 weeks, sub filter $f_{23}$ will be updated. On the other hand, sub filter $f_6$ will be updated in the case that the record's retention policy is 12 weeks.

(2) The query steps are same. No hit in all the sub filters means the data element being searched for does not exist in the data structure, otherwise it exists in the data structure.

(3) The sub filter clean policy is same. The sub filter only cleans out its buffer at the beginning of the master state. It is straightforward to see that all entries will be cleaned at most t time after its data deletion regardless of the variant retention policy.

(4) Use of scalable bloom filters as the sub filter structure enables adaptability and scalability. Scalable bloom filter is a variant of the basic bloom filters that can adapt dynamically to the number of data elements stored therein, while assuring a maximum false positive probability. In the FIG. 3 and FIG. 4 embodiments, the number of data elements in each sub blooms filter is not the same. The number of data elements can be very different sometimes. As such, a scalable bloom filter is an advantageous choice for the data structure type of a sub bloom filter.

Regarding the deletion example in FIG. 3, assume there are two data elements, D1 and D2, with retention 3t, that were inserted during time period t2~t3. Assume another two data elements, D3 and D4, whose retention period is 2t, that were inserted during time period t3~t4. Let us mark their deletion time T' as T1', T2', T3' and T4'. It is straightforward to find 5t<T1'<T2'<6t and 5t<T3'<T4'<6t. In other words, D1, D2, D3 and D4 will all be deleted after 5t and before 6t. Then, it would be safe to clear sub bloom filter G in time 6t.

FIG. 4 illustrates a rolling bloom filter data structure 400 for supporting space-based retention policies. As shown, the rolling bloom filter data structure 400 comprises four sub bloom filter data structures 402-A, 402-B, 402-C and 402-D.

Different than a time-based retention policy, in a space-based retention policy, data is overwritten when disk space runs out. While the clean operation in the basic rolling bloom filter is based on time, this does not work for a space-based retention policy. To address this issue, an embodiment is provided wherein the rotation of the master sub filter recognition is space-based rather than time-based.

Assume that system capacity is designated as SC and the rolling bloom filter is composed of s sub filters. Then, each sub filter is responsible for records with a total size of:

$$sc=SC/s-1.$$

Comparing the space-based retention policy embodiment with the basic rolling bloom filter explained above in the context of FIG. 2:

(1) A global space counter (GC) is maintained in the space-based embodiment which keeps a running total of total memory space written.

(2) The master role switch occurs every instance that GC increases every sc=SC/s-1 in size.

(3) The clean policy is same, i.e., it happens at the beginning of the master role switch.

(4) The query process is same as for the basic rolling bloom filter.

(5) Scalable bloom filters can be used in the space-based embodiment if the file size is significantly different.

Note that in the space-based retention policy embodiment, each sub bloom filter takes responsibility (as the master sub bloom filter) of the same size of data rather than the same time period. For example, in FIG. 4, sub bloom filter 402-A records the first 1T data; sub bloom filter 402-B is responsible for data after 1T but before 2T, and so on. Since written files can have different sizes, the numbers of records in each sub filter can be very different. In this scenario also, scalable bloom filters can improve space efficiency. In FIG. 4, data recorded in 402-A, which is the first 1t data, will be deleted before the instance when the data of 4t (not the size of a single file, but the total size) is inserted. So, it is then safe to start the new master rotation round with sub bloom filter 402-A.

Figure 5:
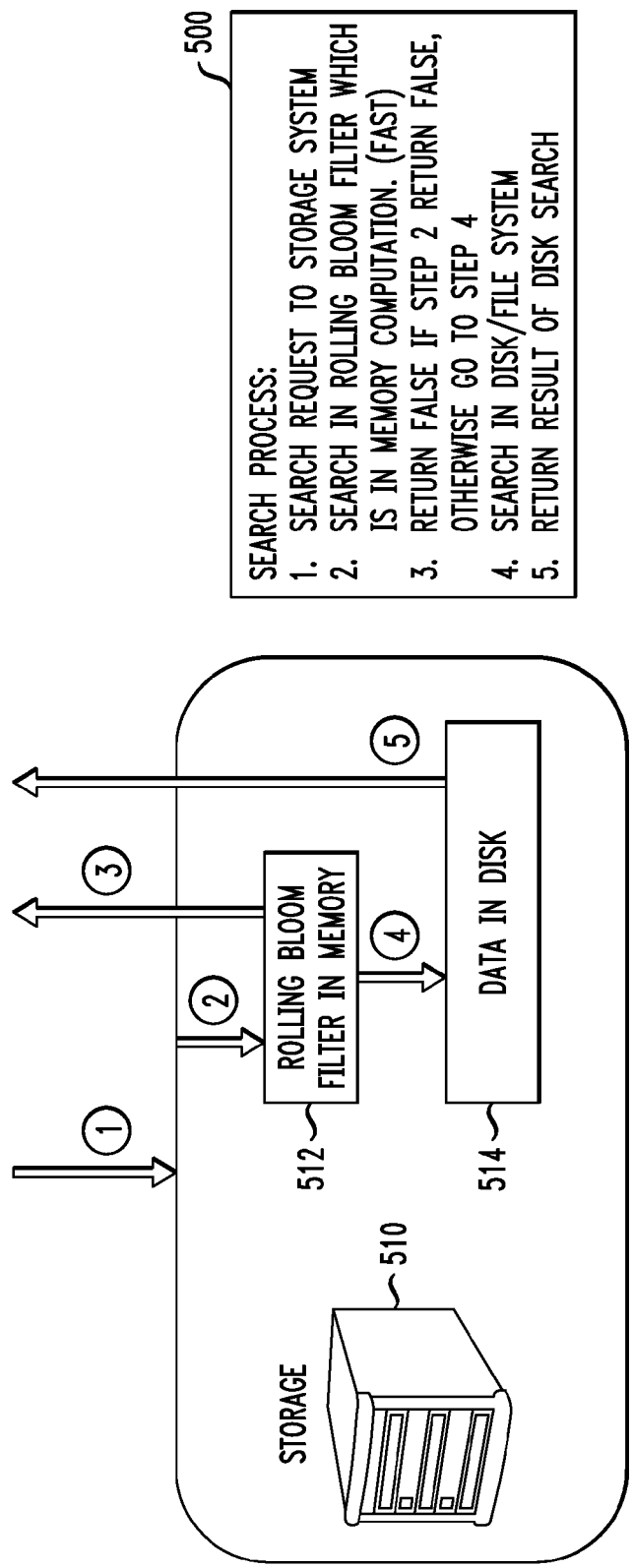
FIG. 5 illustrates a data storage system and methodology with a rolling bloom filter in accordance with one embodiment of the invention.

FIG. 5 illustrates a data storage system and methodology with a rolling bloom filter in accordance with one embodiment of the invention. More particularly, FIG. 5 illustrates an example of how one of the rolling bloom filter data structures described above in the context of FIGS. 2-4 is implemented in a data storage system. Assume that a data storage system 510 includes a rolling bloom filter 512 and a disk of data 514 (although the system could include other components, e.g., multiple rolling bloom filters and/or multiple disks). Note that the rolling bloom filter 512 represents the data stored on disk 514 (disk/file system). Methodology 500 describes how the rolling bloom filter 512 operates in the data storage system:

Step 1: the data storage system receives a search request to search for at least one data element (e.g., record or file stored in the data storage system).

Step 2: the rolling bloom filter 512 is searched for the data element (note that this is a fast memory computation).

Step 3: the data storage system returns a false if step 2 returns a false, otherwise the methodology go to step 4.

Step 4: search in disk/file system 514.

Step 5: return result of disk search.

Figure 6:
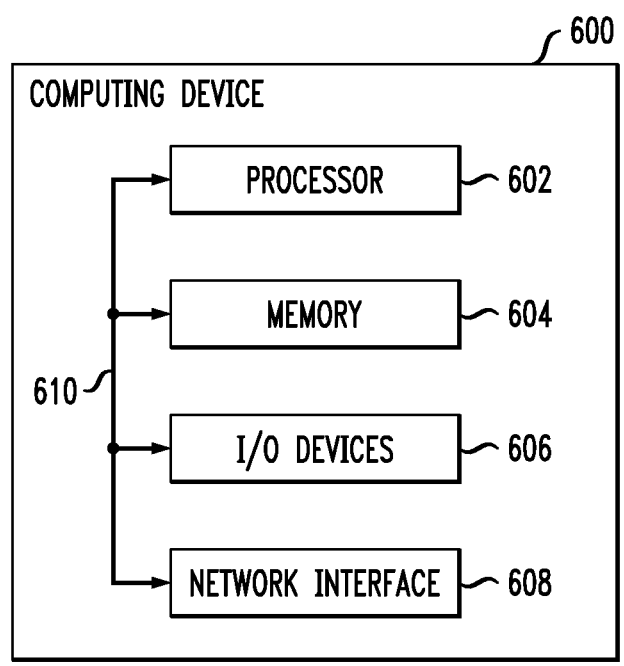
FIG. 6 illustrates a computing architecture for one or more elements of the data storage system of FIG. 5.

FIG. 6 illustrates a computing device architecture for one or more components of the data storage system of FIG. 5. That is, computing device architecture 600 in FIG. 6 may be implemented by the rolling bloom filter 512 (which can be any of the rolling bloom filter embodiments described above) and the disk/file system 514. The computing device architecture 600, as illustrated, comprises a processor 602, a memory 604, input/output devices 606 and network interface 608, all coupled via a bus 610.

The processor 602 may comprise a microprocessor, a microcontroller, an application-specific integrated circuit (ASIC), a field programmable gate array (FPGA) or other type of processing circuitry, as well as portions or combinations of such circuitry elements.

The memory 604 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the processor 602 causes the device to perform functions associated with one or more of the components of the data storage system 500 in FIG. 5. One skilled in the art would be readily able to implement such software given the teachings provided herein. Other examples of computer program products embodying embodiments of the invention may include, for example, optical or magnetic disks.

The input/output devices 606 may comprise one or more mechanisms for inputting data to the processor 602 (e.g., keyboard, keypad or pointing device), and one or more mechanisms for providing results or otherwise presenting information associated with the processor 602 (e.g., display, screen or other form of presentation device).

The network interface 608 comprises circuitry that serves to interface the computing device with a network (not shown) and/or other system components. Such circuitry may comprise conventional transceivers of a type well known in the art.

The computing device architecture 600 may comprise additional known components (not expressly shown) such as parallel processing systems, physical machines, virtual machines, virtual switches, storage volumes, etc. Again, the computing device architecture shown in the figure is presented by way of example only, and data storage system 500 may include additional or alternative computing architectures, as well as numerous distinct computing architectures in any combination.

Also, numerous other arrangements of servers, computers, storage devices or other components are possible in the data storage system 510. Such components can communicate with other elements of the data storage system 510 over any type of network or networks.

Furthermore, it is to be appreciated that the data storage system 510 of FIG. 5 can comprise virtual machines (VMs) implemented using a hypervisor. A hypervisor is an example of what is more generally referred to herein as "virtualization infrastructure." The hypervisor runs on physical infrastructure. As such, the rolling bloom filter techniques illustratively described herein can be provided as one or more cloud services. The cloud services thus run on respective ones of the virtual machines under the control of the hypervisor. Data storage system 500 may also include multiple hypervisors, each running on its own physical infrastructure. Portions of that physical infrastructure might be virtualized.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used in one or more embodiments of the invention is the VMware® vSphere™ which may have an associated virtual infrastructure management system such as the VMware® vCenter™. The underlying physical infrastructure may comprise one or more distributed processing platforms that include storage products such as VNX and Symmetrix VMAX, both commercially available from EMC Corporation of Hopkinton, Mass. A variety of other computing and storage products may be utilized to implement at least a portion of the cloud services.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus, comprising:
a memory storing a data structure comprising two or more sub data structures representing a given data set, each of the two or more sub data structures comprising an array of bit positions and having a set of hash functions associated therewith, wherein each of the hash functions is operable to map an element of the given data set to at least one of the bit positions of the array; and
at least one processor device coupled to the memory and configured to sequentially recognize one of the two or more sub data structures as a master sub data structure and the others of the two or more sub data structures as slave sub data structures during a master sub data structure rotation cycle, wherein insertion and deletion of elements in the data structure is based on the recognition of each of the two or more sub data structures as the master sub data structure or one of the slave sub data structures, wherein the master sub data structure is the sub data structure upon which one or more operations directed to the data structure are referenced, and wherein the master sub data structure rotation cycle is a function of a given policy for retaining data in the data structure;
wherein the at least one processor device is further configured to delete elements stored in the one of the two or more sub data structures recognized as the master sub data structure after recognition of the sub data structure as the master sub data structure.

2. The apparatus of claim 1, wherein the at least one processor device is further configured to, during a given time period, add an additional element to the data structure by inserting the additional element into the one of the two or more sub data structures recognized as the master sub data structure.

3. The apparatus of claim 2, wherein sequential recognition comprises recognizing, for a subsequent time period following the given time period, another one of the two or more sub data structures as the master sub data structure and the others of the two or more sub data structures as the slave sub data structures.

4. The apparatus of claim 3, wherein the at least one processor device is further configured to delete, at the start of the subsequent time period, elements stored in the sub data structure now recognized as the master sub data structure.

5. The apparatus of claim 4, wherein the at least one processor device is further configured to add, during the subsequent time period, another additional element to the data structure by inserting the other additional element into the sub data structure now recognized as the master sub data structure.

6. The apparatus of claim 1, wherein an additional element inserted into the data structure is retained in the data structure from the time of insertion into the master sub data structure until the end of the master sub data structure rotation cycle.

7. The apparatus of claim 1, wherein the at least one processor device is further configured to query the data structure for a given element by searching each of the two or more sub data structures for the given element.

8. The apparatus of claim 1, wherein the two or more sub data structures each have substantially equal storage capacity.

9. The apparatus of claim 1, wherein the two or more sub data structures each utilize the same set of hash functions.

10. The apparatus of claim 1, wherein the at least one processor device is further configured to add an additional element to the data structure by inserting the additional element into one of the master sub data structure and the slave sub data structures, wherein the sub data structure in which to insert the additional element depends on a selected one of two or more retention time policies.

11. The apparatus of claim 1, wherein sequential recognition comprises rotating from a first one of the sub data structures to a second one of the sub data structures based on a given storage threshold being reached.

12. A method for processing data implemented via at least one processor device, comprising:
maintaining, via the processor device, a data structure comprising two or more sub data structures representing a given data set, each of the two or more sub data structures comprising an array of bit positions and having a set of hash functions associated therewith, wherein each of the hash functions is operable to map an element of the given data set to at least one of the bit positions of the array;
sequentially recognizing, via the processor device, one of the two or more sub data structures as a master sub data structure and the others of the two or more sub data structures as slave sub data structures during a master sub data structure rotation cycle, wherein insertion and deletion of elements in the data structure is based on the recognition of each of the two or more sub data structures as the master sub data structure or one of the slave sub data structures, wherein the master sub data structure is the sub data structure upon which one or more operations directed to the data structure are referenced, and wherein the master sub data structure rotation cycle is a function of a given policy for retaining data in the data structure; and
deleting, via the processor device, elements stored in the one of the two or more sub data structures recognized as the master sub data structure after recognition of the sub data structure as the master sub data structure.

13. The method of claim 12, further comprising adding, during a given time period, an additional element to the data structure by inserting the additional element into the one of the two or more sub data structures recognized as the master sub data structure.

14. The method of claim 12, further comprising adding an additional element to the data structure by inserting the additional element into one of the master sub data structure and the slave sub data structures, wherein the sub data structure in which to insert the additional element depends on a selected one of two or more retention time policies.

15. The method of claim 12, wherein sequential recognition comprises rotating from a first one of the sub data structures to a second one of the sub data structures based on a given storage threshold being reached.

16. A computer program product comprising a non-transitory processor-readable storage medium having encoded therein executable code of one or more software programs, wherein the one or more software programs when executed by the at least one processor device cause the processor device to perform the steps of:
storing a data structure comprising two or more sub data structures representing a given data set, each of the two or more sub data structures comprising an array of bit positions and having a set of hash functions associated therewith, wherein each of the hash functions is operable to map an element of the given data set to at least one of the bit positions of the array;
sequentially recognizing one of the two or more sub data structures as a master sub data structure and the others of the two or more sub data structures as slave sub data structures during a master sub data structure rotation cycle, wherein insertion and deletion of elements in the data structure is based on the recognition of each of the two or more sub data structures as the master sub data structure or one of the slave sub data structures, wherein the master sub data structure is the sub data structure upon which one or more operations directed to the data structure are referenced, and wherein the master sub data structure rotation cycle is a function of a given policy for retaining data in the data structure; and deleting elements stored in the one of the two or more sub data structures recognized as the master sub data structure after recognition of the sub data structure as the master sub data structure.

17. An apparatus, comprising:

at least one processor device; and a bloom filter data structure comprising two or more sub bloom filters, maintained in a memory associated with the at least one processor device, representing a given data set, each of the two or more sub bloom filters comprising an array of bit positions and having a set of hash functions associated therewith, wherein each of the hash functions is operable to map an element of the given data set to at least one of the bit positions of the array, and wherein the bloom filter data structure is operable to enable the at least one processor device coupled to the bloom filter data structure to sequentially recognize one of the two or more sub bloom filters as a master sub bloom filter and the others of the two or more sub bloom filters as slave sub bloom filters in a master sub bloom filter rotation cycle, wherein insertion and deletion of elements in the bloom filter data structure is based on the recognition of each of the two or more sub bloom filters as the master sub bloom filter or one of the slave sub bloom filters, wherein the master sub bloom filter is the sub bloom filter upon which one or more operations directed to the bloom filter data structure are referenced, and wherein the master sub bloom filter rotation cycle is a function a given policy for retaining data in the bloom filter data structure, and wherein the bloom filter data structure is operable to enable the at least one processor device coupled to the bloom filter data structure to delete elements stored in the one of the two or more sub bloom filters recognized as the master sub bloom filter after recognition of the sub bloom filter as the master sub bloom filter.

18. The method of claim 12, further comprising querying, via the processor device, the data structure for a given element by searching each of the two or more sub data structures for the given element.

19. The computer program product of claim 16, wherein the one or more software programs when executed by the at least one processor device cause the processor device to query the data structure for a given element by searching each of the two or more sub data structures for the given element.

20. The apparatus of claim 1, wherein the at least one processor device is enabled to query the bloom filter data structure for a given element by searching each of the two or more sub bloom filters for the given element.

* * * * *